United States Patent [19]
Nigol

[11] 3,888,796
[45] June 10, 1975

[54] SEMICONDUCTIVE GLAZE COMPOSITIONS

[76] Inventor: Olaf Nigol, 272 Markland Dr., Etobicoke, Ontario, Canada

[22] Filed: Oct. 27, 1972

[21] Appl. No.: 301,340

[52] U.S. Cl. .................. 252/518; 106/48; 106/44; 252/511; 252/520; 252/521
[51] Int. Cl. ............................................ H01b 1/08
[58] Field of Search .......... 252/518, 519, 520, 521; 106/48, 49

[56] References Cited
UNITED STATES PATENTS

| | | | |
|---|---|---|---|
| 2,857,294 | 10/1958 | Davis | 252/518 X |
| 2,909,438 | 10/1959 | Kautz | 106/48 |
| 3,095,321 | 6/1963 | Breedlove | 106/48 |
| 3,287,284 | 11/1966 | Norman | 252/518 |
| 3,383,225 | 5/1968 | Stradley | 106/48 |
| 3,484,284 | 12/1969 | Oates et al. | 252/518 X |
| 3,493,404 | 2/1970 | Earl | 106/48 |
| 3,532,524 | 10/1970 | Petticrew | 106/48 |
| 3,607,789 | 9/1971 | Murthy et al. | 252/518 |
| 3,674,520 | 7/1972 | Suzuki et al. | 106/48 X |
| 3,700,606 | 10/1972 | Parks | 252/518 |

*Primary Examiner*—Benjamin R. Padgett
*Assistant Examiner*—R. E. Schafer
*Attorney, Agent, or Firm*—Ridout & Maybee

[57] ABSTRACT

A semiconductive glaze composition, more particularly for ceramic insulators, comprises a base glaze in which stannic oxide and antimony trioxide are incorporated in an amount from 3 to 12.5% by weight, and zinc oxide in an amount from 0.5 to 3% by weight.

12 Claims, 3 Drawing Figures

SEMICONDUCTIVE GLASE COMPOSITIONS

This invention relates to semiconducting glaze compositions for use as electrically conductive glaze coatings on ceramic insulators. Such coatings are sometimes provided on high voltage ceramic insulators for the purpose of controlling the voltage distribution over their surfaces to reduce the tendency to electrical discharge.

Semiconducting glaze compositions for this purpose usually consist of a base glaze in which various additional metal oxides are incorporated. Such a glaze composition is normally applied to the surface of the insulator, or to the unfired ceramic body of the insulator, as an aqueous slurry and then fired onto the surface. The metal oxides incorporated in the base glaze commonly comprise blue tin oxide, which is a pre-calcined mixture of stannic oxide and antimony pentoxide, and zinc oxide. In practice it is found necessary to incorporate the blue tin oxide in an amount not less than 12.5% by weight of the total solids in the composition, and up to 45% by weight, in order to produce a glaze coating having a useful conductivity.

The present invention is based on the discovery that by incorporating a mixture consisting of stannic oxide and antimony trioxide, instead of stannic oxide and antimony pentoxide, a considerably lower amount of the mixture can be used. This is possible because antimony trioxide has a naturally smaller particle size than has antimony pentoxide. The advantages of the invention based on this discovery are:

a. a two-to threefold reduction in the negative temperature coefficient of the glaze resistivity as compared to existing semiconductive glazes;

b. greatly improved corrosion resistance of the glazes because of the lower metal oxide content; and c. lower cost due to smaller amounts of metal oxide required to produce the necessary conductivity.

A semiconducting glaze composition according to the present invention is composed of a base glaze incorporating tin oxide ($SnO_2$), antimony trioxide ($Sb_2O_3$), and zinc oxide (ZnO), the tin oxide and antimony trioxide being present in an amount from 3 to 12.5% by weight of the total solids in the composition and the zinc oxide being present in an amount from 0.5 to 3% by weight of the total solids in the composition. The purpose of the zinc oxide is to stabilize the glaze resistivity with respect to firing temperature.

Preferably, the mean particle size of the base glaze is less than 10 microns, and the mean particle size of the tin and antimony oxides is less than 0.5 microns.

Examples of semiconducting glazes in accordance with the invention, and their application to ceramic insulators, will now be described with reference to the accompanying drawings, in which.

GENERAL

Basically, two different types of semiconductive glaze have been developed. In one type, hereinafter referred to as a "one-step" glaze, the tin oxide and antimony trioxide are mixed in proper proportions with the base glaze materials and water to produce a glazing slurry or slip. In the other type, hereinafter referred to as a "two-step" glaze, the tin oxide and antimony trioxide are first pre-calcined at the optimum temperature and then ground and mixed in proper proportions with the base glaze materials and water to produce the glazing slurry or slip. In each case the slurry is applied to unfired but dry porcelain insulators, or to pre-fired (bisque) porcelain insulators, by dipping, spraying or flooding. The insulators are then fired in a carefully controlled firing cycle so as to produce the required semiconductive properties of the glaze and high mechanical strength of the insulator bodies and the glaze.

In the case of a one-step glaze, the insulator to which the glaze is applied must be fired within a temperature range that will produce the required semiconductive properties of the glaze and mechanical properties of the porcelain insulator. Since these properties are quite temperature dependent, the use of the one-step glaze is possible only with a limited number of metal oxides. The two-step glaze provides freedom to process the semiconductive materials separately at their optimum calcining temperatures. For example, calcining can be performed at much lower or much higher temperatures than that required to produce good quality porcelain and cover glazes. Various metal oxides may be used in such a semiconductive glaze.

Although the base glaze, or cover glaze, composition will in general have some effect on the properties of the final semiconductive glaze, several compositions have been used with good results. Two preferred base glaze compositions are listed in Examples 1 and 2.

Example 1

| Base Glaze Composition A | |
| --- | --- |
| Component | % by weight |
| $SiO_2$ | 70.00 |
| $Al_2O_3$ | 13.66 |
| CaO | 11.84 |
| $K_2O$ | 2.71 |
| $Na_2O$ | 0.76 |
| $TiO_2$ | 0.34 |
| $Fe_2O_3$ | 0.30 |
| MgO | 0.09 |

Example 2

| Base Glaze Composition B | |
| --- | --- |
| Component | % by weight |
| $SiO_2$ | 70.75 |
| $Al_2O_3$ | 11.64 |
| CaO | 13.91 |
| $K_2O$ | 2.50 |
| $Na_2O$ | 0.68 |
| $TiO_2$ | 0.18 |
| $Fe_2O_3$ | 0.28 |
| MgO | 0.06 |

In each case, the mean particle size of base glaze is less than 10 microns.

Figure 1:
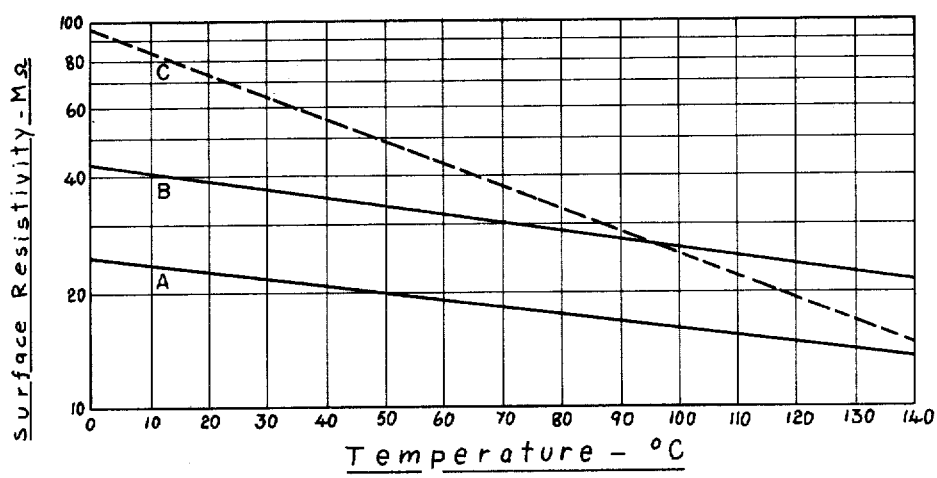
FIG. 1 is a graph illustrating the variation in surface resistivity with temperature for different glazes.

The mixture of tin oxide and antimony trioxide, whether or not pre-calcined, should be present in the semiconductive glaze composition in an amount from 3 to 12.5% by weight of the total solids in the composition, the ratio of tin oxide to antimony trioxide being in the range 4:1 to 50:1. The mean particle size of these oxides is preferably less than 0.5 microns. The small particle sizes of the tin oxide and antimony trioxide, and the reduced amounts used in the glaze composition, improve the negative temperature coefficient of resistance, and improve the corrosion resistance and the general uniformity of the resultant glaze. In FIG. 1, the negative temperature coefficient, or effect of temperature upon surface resistivity of the resultant glaze, is illustrated graphically for semiconductive glazes produced using the one-step glaze (Curve A), the two-step glaze (Curve B), and a known composition using blue tin oxide (Curve C).

Figure 2:
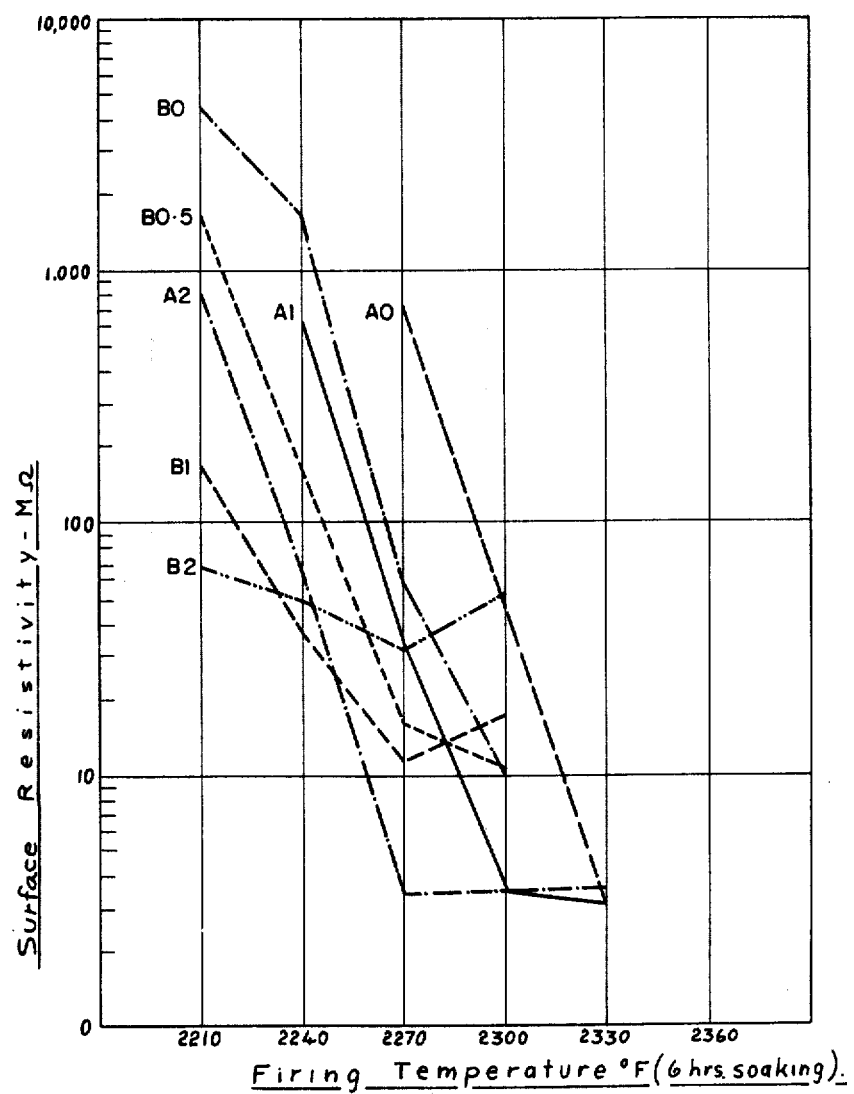
FIG. 2 is a graph illustrating the effect of dipping time (during application of the glaze) upon surface resistivity.

In processing semiconductive glazes it is found that the glaze resistivity is very sensitive to the maximum firing temperature and, to a smaller degree to the time duration of this maximum temperature (or soaking time), and also to the rates of heating and cooling during the firing cycle. Because kiln temperatures are never uniform in practice, a large variation can occur in the glaze resistivity. Since the total resistance of an insulator must be reasonably well controlled, this can lead to relatively high reject rates. It has been found that this problem can be overcome by adding a small amount of zinc oxide to the composition. In this way a 50°F–100°F. temperature range can be produced between 2200°F and 2400°F. (maximum firing temperature) over which the glaze resistivity remains substantially constant. The effect of the zinc oxide is illustrated in FIG. 2, in which curves A0, A1 and A2 show the relationship between resistivity and maximum firing temperature for a first glaze composition to which zinc oxide has been added in amounts 0%, 1% and 2% by weight, respectively, and in which curves B0, B0.5 B1, B2 show the same relationship for a difference glaze composition to which zinc oxide has been added in the amounts 0%, 0.5%, 1%, and 3% by weight respectively. It has been established that an excessive amount of zinc oxide increases the negative temperature coefficient of the glaze resistivity and radically affects the mechanical properties of the glaze. For this reason, the amount of zinc oxide must be limited to the rate 0.5 to 3% by weight of total solids in the composition.

Figure 3:
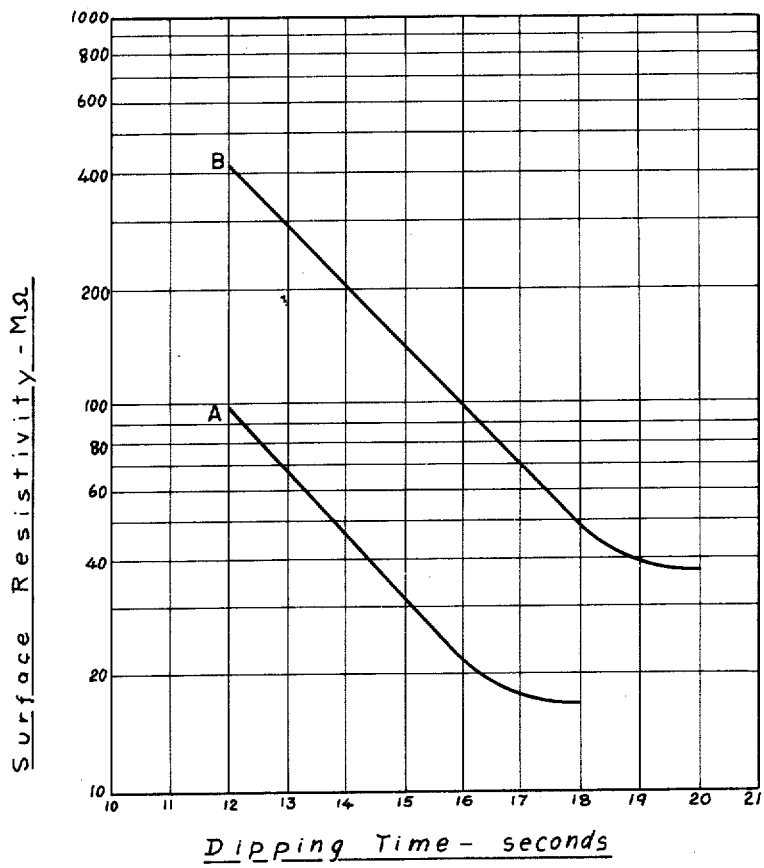
FIG. 3 is a graph illustrating the effect of firing temperature on resistivity.

A one-step glaze composition as specified in Example 3 was applied to dry, unfired porcelain by a dipping process and fired at 2300°F. for six hours, resulting in surface resistivities in the range from 16 to 100 megohms per square for dipping times ranging from 20 to 10 seconds respectively, as shown by curve A in FIG. 3.

Example 3

"One-Step" Glaze

| | |
|---|---|
| $SnO_2$ | 5% by weight of solids |
| $Sb_2O_3$ | 1% by weight of solids |
| ZnO | 1% by weight of solids |
| Base Glaze Comp. B | 93% by weight of solids |
| (Water to solids ratio = | 1.45) |

A two-step glaze composition as specified in Example 4 was applied to dry, unfired porcelain by a dipping process, and fired at 2300°F. for six hours, resulting in surface resistivities in the range from 40 to 400 megohms per square for dipping times ranging from 20 to 10 seconds respectively, as shown by curve B in FIG. 3.

Example 4

"Two-Step Glaze"

| | |
|---|---|
| $SnO_2+Sb_2O_3$* | 6% by weight of solids |
| ZnO | 1% by weight of solids |
| Base Glaze Comp. B | 93% by weight of solids |
| (Water to solids ratio = | 1.3) |

*9 parts $SnO_2$ to 1 part $Sb_2O_3$ calcined at 1920°F. for 1 hour 20 minutes.

The negative temperature coefficient for both these glazes, as shown in FIG. 1, is less than 0.35% per °C. This is about three times smaller than that for glazes developed earlier and using blue tin oxide.

The resistivity of a glaze can be increased by reducing the amount of $SnO_2$ and $Sb_2O_3$ present in the glazing slurry, or reduced by increasing their amounts. Changes in the glaze resistivity can also be effected by varying the relative proportions of $SnO_2$ and $Sb_2O_3$, or the water to solids ratio, the amount of zinc oxide, the particle sizes of the various glaze components, or the firing temperature and firing cycle. Furthermore the resistivity of an applied semiconductive glaze can be increased or decreased by refiring the insulator to which the glaze is applied at a different temperature from that at which it was first fired.

What I claim as my invention is:

1. A semiconductive glaze composition especially adapted for use in the production of semiconductive glaze coatings on ceramic insulators, comprising a base glaze in admixture with tin oxide ($SnO_2$), antimony trioxide ($Sb_2O_3$) and zinc oxide (ZnO), the base glaze consisting essentially of silica, alumina and fluxes and being adapted to be fired at a temperature in the range 2200°F. to 2400°F., the tin oxide and antimony trioxide being present in an amount from 3 to 12.5% by weight of the total solids in the composition, and the zinc oxide being present in an amount from 0.5 to 3% by weight of the total solids in the composition.

2. A semiconducting glaze composition according to claim 1, in which the ratio of tin oxide to antimony trioxide is in the range 4:1 to 50:1 by weight.

3. A semiconducting glaze composition according to claim 1, in which the ratio of tin oxide to antimony trioxide is about 10:1 by weight.

4. A semiconducting glaze composition according to claim 1, in which the mean particle size of the base glaze is less than 10 microns.

5. A semiconducting glaze composition according to claim 4, in which the mean particle size of the tin oxide and antimony trioxide is less than 0.5 microns.

6. A semiconducting glaze composition according to claim 5, in which the zinc oxide is present in an amount from 0.5 to 1.0% of the total solids in the composition.

7. A semiconducting glaze composition comprising a base glaze in admixture with zinc oxide (ZnO) and a pre-calcined mixture of tin oxide ($SnO_2$) and antimony trioxide ($Sb_2O_3$), the base glaze consisting essentially of silica, alumina and fluxes and being adapted to be fired at a temperature in the range 2200°F. to 2400°F., the pre-calcined mixture being present in an amount from 3 to 12.5% by weight of the total solids in the composition, and the zinc oxide being present in an amount from 0.5 to 3% by weight of the total solids in the composition.

8. A semiconducting glaze composition according to claim 7, in which the ratio of tin oxide to antimony trioxide is in the range 4:1 to 50:1 by weight.

9. A semiconducting glaze composition according to claim 7, in which the ratio of tin oxide to antimony trioxide is about 10:1 by weight.

10. A semiconducting glaze composition according to claim 7, in which the mean particle size of the base glaze is less than 10 microns.

11. A semiconducting glaze composition according to claim 10, in which the mean particle size of the tin oxide and antimony trioxide is less than 0.5 microns.

12. A semiconducting glaze composition according to claim 11, in which the zinc oxide is present in an amount from 0.5 to 1.0% of the total solids in the composition.

* * * * *